United States Patent [19]

Melcher

[11] Patent Number: 4,687,685

[45] Date of Patent: Aug. 18, 1987

[54] PROCESS FOR IMPREGNATING A PLANAR COMPRESSIBLE CARRIER MATERIAL WITH SYNTHETIC RESIN, AS WELL AS DEVICE FOR WORKING THIS PROCESS

[75] Inventor: Gerhard Melcher, Vienna, Austria

[73] Assignee: Isovolta Oesterreichische Isolierstoffwerke Aktiengesellschaft, Wiener Neudorf, Austria

[21] Appl. No.: 841,867

[22] PCT Filed: Jun. 24, 1985

[86] PCT No.: PCT/AT85/00016

§ 371 Date: Feb. 6, 1986

§ 102(e) Date: Feb. 6, 1986

[87] PCT Pub. No.: WO86/00260

PCT Pub. Date: Jan. 16, 1986

[30] Foreign Application Priority Data

Jun. 22, 1984 [AT] Austria .................................. 2023/84

[51] Int. Cl.$^4$ ...................... B05D 3/12; B05C 11/00; B05C 3/02; B05B 13/02
[52] U.S. Cl. ...................................... 427/366; 118/44; 118/60; 118/325; 118/415; 118/641; 118/642
[58] Field of Search ................... 118/44, 60, 325, 415, 118/641, 642; 427/366

[56] References Cited

U.S. PATENT DOCUMENTS 4,174,243 11/1979 Magarian ........................ 427/345 X
4,208,230 6/1980 Magarian ........................ 427/177 X
4,407,867 10/1983 Bruck et al. ..................... 118/642 X
4,477,495 10/1984 Ring et al. ...................... 427/366 X

FOREIGN PATENT DOCUMENTS 2042202 3/1972 Fed. Rep. of Germany.

Primary Examiner—Michael R. Lusignan
Attorney, Agent, or Firm—Bierman and Muserlian

[57] ABSTRACT

The process serves to impregnate planar carrier materials, especially those in the form of continuous webs, with synthetic resin to manufacture a stackable product, such as, e.g., paper-prepregs to be used for the manufacture of synthetic-resin-laminated panels.

For the process, a highly viscous liquid synthetic resin coating (5) is applied to one surface of the carrier material (1), the coating is heated to a higher temperature, during or after which, respectively, the synthetic resin (4) of the coating (5) is at least in part absorbed by the carrier material (1). The carrier material (1') thusly coated with synthetic resin is then briefly subjected to such pressure, e.g., with the aid of a pair of pressure rollers (9), that the synthetic resin (4) evenly permeates the carrier material. For the concurrent impregnation of several carrier materials (1), the superposed carrier materials (1') coated with synthetic resin can be subjected to mechanical pressure.

In a device for the concurrent impregnation of two continuous carrier material webs, the synthetic resin coating is introduced between these two carrier material webs (46, 47).

13 Claims, 3 Drawing Figures

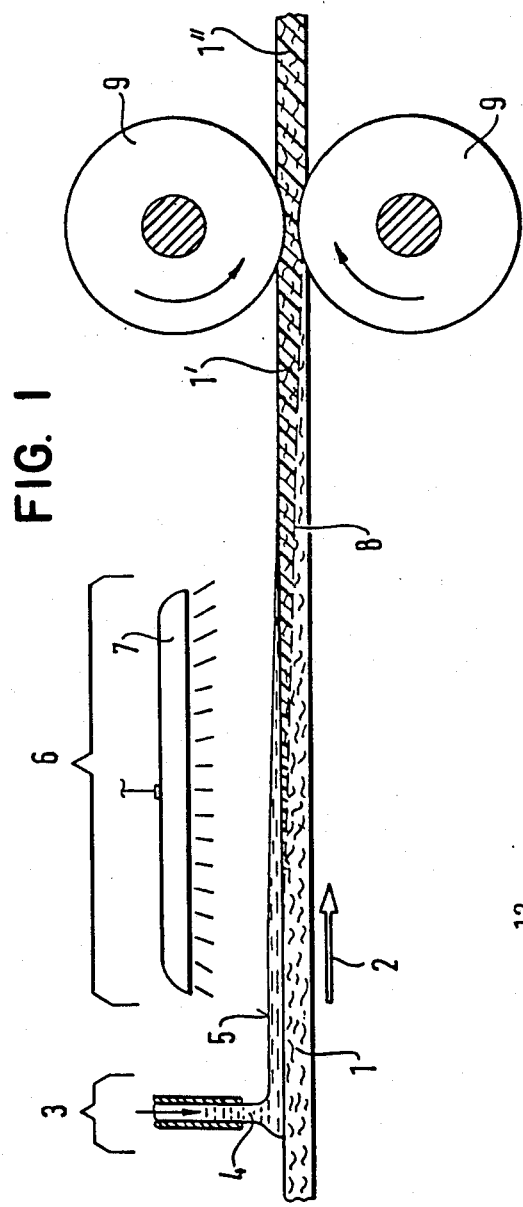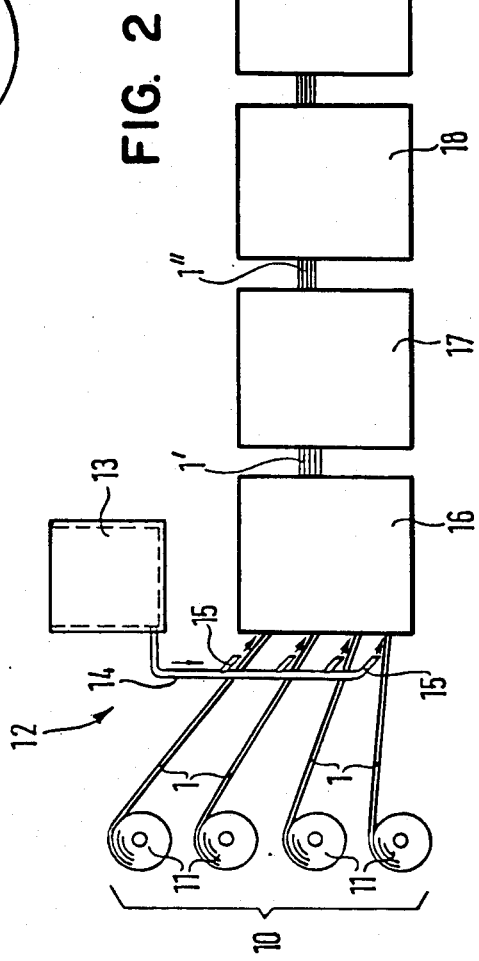

PROCESS FOR IMPREGNATING A PLANAR COMPRESSIBLE CARRIER MATERIAL WITH SYNTHETIC RESIN, AS WELL AS DEVICE FOR WORKING THIS PROCESS

TECHNICAL DOMAIN

The invention is concerned with a process for impregnating with synthetic resin a planar, compressible carrier material, whose air permeability according to Gurley is more than 1.0 s, to produce a stackable product, in particular a so-called "prepreg". Such carrier materials are, e.g., papers used for the manufacture of synthetic resin-laminated sheets. The air permeability of such papers as determined according to Gurley is generally between 10 and 20 s, though for some special papers values between 1 and 5 s, and even values above 20 s have been measured.

The invention is furthermore concerned with a device for working the process according to the invention.

STATE OF THE ART

In a generally customary process of the aforementioned type, a continuous web or carrier material, e.g., a paper web, passes through an impregnating vat situated in an impregnating station, which contains a synthetic resin solution of low viscosity, which completely saturates the paper web during its passage. The paper web then passes through a pair of doctor rollers and subsequently through a drying tunnel, in which the solvent of the synthetic resin solution absorbed by the paper is to a large extent steamed off in a hot air current and is removed with the exhaust air of the installation.

The paper web impregnated with synthetic resin in this manner is, after leaving teh drying tunnel usually separated into single sheets which are also called "prepregs". Synthetic resin-laminated plastic panels can then by manufactured from such prepregs, e.g., by laminating the prepregs into parcels and hot-pressing these parcels at high pressure in the known manner. This known method has the advantage that the resin coating of the paper web can be relatively simply and precisely dosed in the doctor rollers by adjusting the concentration of the synthetic resin solution and by squeezing out the excess resin solution. However, it has the disadvantage of relatively high energy consumption, primarily due to the production of hot air required for the drying process. This energy need is increased further, when —in order to prevent strain on the environment —the exhaust air removed from the installation, which in addition to water vapor also comprises volatile low-molecular resin components and possibly also organic solvent vapors, must be cleansed by burning.

DESCRIPTION OF THE INVENTION

The invention has the primary objective to disclose a process for impregnating a planar compressible carrier material with synthetic resin to produce a stackable product, where the carrier material —similar to the papers customarily used in the manufacture of laminated plastic panels —has an air permeability with values higher than 1.0 s according to Gurley, and with this method permitting similarly precise dosing as the aforesaid known method, it manages to do this with a considerably lower consumption of energy.

This problem is solved in the process according to the invention, wherein initially a liquid synthetic resin coating with a synthetic resin content of 70 to 100° is applied to one surface of the carrier material, whereby the synthetic resin coating, which is raised to a higher temperature before and/or after such application, at least partially penetrates into the carrier material, and wherein the carrier material to which synthetic resin has thusly been applied is thereupon subjected to such mechanical pressure that the synthetic resin possibly still present as a surface coating penetrates into the carrier material, and wherein the synthetic resin evenly permeates the carrier material, with the pore volume of the carrier material being advantageously reduced under the pressure action to such an extent that the amount of synthetic resin applied is sufficient to at least almost completely permeate the pore volume of the carrier material.

According to advantageous embodiments of the invention, the process according to the invention is characterized by that mechanical pressure is applied only after most or all of the synthetic resin of the synthetic resin coating has penetrated into the carrier material.

In an additional advantageous embodiment, the process according to the invention is characterized by that —for the concurrent production of several impregnated carriers —several carrier materials to which synthetic resin has bee applied, in which the synthetic resin has at least partly penetrated into the carrier material, are exposed to mechanical pressure while superposed.

According to another advantageous embodiment of the process according to the invention —for the concurrent production of two carrier materials impregnated with synthetic resin —a synthetic resin coating is introduced between two carrier materials in such a manner that it is in contact with both carrier materials, whereupon all is brought to a higher temperature, and the synthetic resin of the synthetic resin coating penetrates at least in part into the adjoining carrier webs, and the whole is then exposed to mechanical pressure.

According to still other advantageous embodiments of the process according to the invention, different carrier materials can be used and/or different carrier materials are impregnated with varying synthetic resins for the concurrent production of several carrier materials impregnated with synthetic resin.

The process according to the invention is used advantageously especially when it is carried through in the form of a continuous process, in which the carrier material or carrier materials, respectively, are used as continuous carrier material webs. The mechanical pressure is then advantageously applied as line pressure by means of pressure rollers, with said line pressure being applied once or advantageously also several times in succession.

The invention is furthermore concerned with an advantageous device for working the process according to the invention. It is characterized by an arrangement for feeding one or more carrier material webs, by one or more arrangements for the application of liquid synthetic resin in the form of layers on or to these carrier material webs, by a heating device for heating the layers of synthetic resin, by a device for applying pressure to the carrier material webs to which synthetic resin has been applied, possibly by a cooling station for the impregnated carrier material webs, and by one or more rolling-up arrangements, or by a cutting defice with stacking arrangement for the impregnated carrier material. The pressure applying device consists to advantage of one or several successively arranged pairs of pressure rollers which can possibly be heated.

In an advantageous embodiment of the invention, a device for the concurrent impregnation of two continuous carrier material webs is characterized by that the device for applying a liquid layer of synthetic resin exhibits a pair of calibrating rolls and a jet, the aperture of which reaches between the calibrating rolls to feed the liquid synthetic resin coating between the two carrier material webs.

BRIEF DESCRIPTION OF THE FIGURES

FIG. 1 shows the essential steps of a preferred method of working the claimed process.

FIG. 2 shows the structure of a device for working the claimed process.

FIG. 1 illustrates in transverse section the essential steps of a preferred method of working the process according to the invention, which serves to impregnate a continuous carrier material web.

Figure 3:
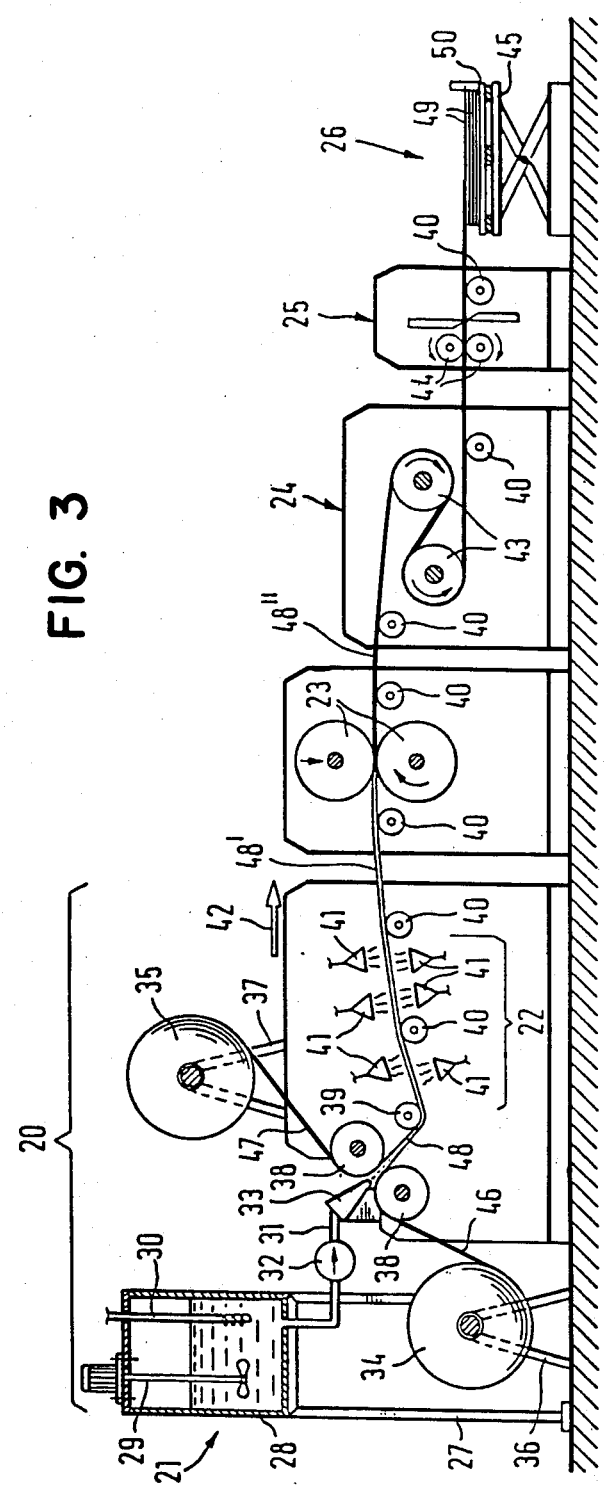
FIG. 3 shows as installation for working the claimed process.

This carrier material web 1, shown excessively thick in FIG. 1 for the purpose of greater clarity, which advantageously can be a paper web, is moved through an impregnating device in the direction of arrow 2. In this impregnating device, in a coating station 3, a liquid synthetic resin 4 of high viscosity is applied distributed evenly over the width of the carrier web, forming a coating 5 on the carrier material web 1. This highly viscous synthetic resin may be, e.g., an aqueous solution of a phenol formaldehyde resin with a resin content of 82% by weight, which at 23° C. has a viscosity of about 100,000 mPa.s.

The thusly coated carrier material web 1 then passes through a heating zone 6, in which —by means of an infrared heating device 7 —the coating 5 is heated to a higher temperature, which for a highly viscous aqueous phenol formaldehyde solution may be 70° to 115° C. As a result of this rise in temperature, a decrease of the viscosity of the synthetic resin occurs, so that the synthetic resin 4 of coating 5 —as indicated by the wedge-shaped zone 8 —progressively penetrates into the carrier material web 1 and is finally completely absorbed by it. However, since the pore volume of the carrier material web 1 is larger than the volume of the absorbed quantity of synthetic resin, this pore volume is not filled by the synthetic resin completely or uniformly.

The carrier material web 1' to which the synthetic resin 4 has thusly been applied then passes through a heated pair of pressure rollers 9 that is maintained at approx. 125° C., in the roll gap of which the carrier material web 1' is compressed for a short time to such an extent, i.e., its pore volume is reduced to such an extent that the quantity of synthetic resin absorbed by the carrier material completely permeates the reduced pore volume. After passing through the roll gap, the thickness of the carrier material and the pore volume of the carrier material increase again, but the even distribution of the synthetic resin over the pore volume, caused by the compression of the carrier material, is substantially maintained. For impregnating paper webs such as are commohly used in the manufacture of synthetic-resin-laminated plastic panels, the pressure to be applied usually ranges from 500 to 1000 N/cm². After passing through the pair of pressure rollers 9, the impregnated carrier material web 1" may also pass through a cooling zone, before it is rolled up or cut into single sheets and stacked. In this process it is of advantage to always maintain such conditions that the resin is never heated to a temperature higher than its boiling point.

According to a variant of the method of working the process according to the invention described with the aid of FIG. 1, the carrier material web 1' coated with synthetic resin is fed to the pair of pressure rollers 9 only after a part of the synthetic resin 4 applied as coating 5 has penetrated into carrier material web. However, the following must be observed:

The pressure obtaining in the roll gap of the pair of pressure rollers must not press away laterally the remaining synthetic resin coating 5, The pores or capillaries of the carrier material must not be so fine that —particularly after reduction of their dimenstions as a result of the compression —with the pressure applied in the roll gap, the synthetic resin can no longer be pressed into these pores or capillaries.

FIG. 2 shows in a block diagram the the structure of a device for working the process according to the invention, in which several continuous carrier material webs are impregnated concurrently in a continuous process. The device comprises a carrier material feeder 10 with carrier material rolls 11, a resin coating station 12 with resin tank 13, resin feeder 14 and coating heads 15, a heating station 16, a device 17 for applying pressure, a cooling station 18, and a cutting and stacking device 19.

In working the impregnating process, the carrier material webs 1 are pulled off the rolls 11 and pass by the respective coating head 15. By means of these coating heads 15, which are fed from the resin tank 13 through the resin feeders 14, there then takes place —in a manner similar to that described with the aid of FIG. 1 —the coating of the carrier material webs 1 with a liquid and highly viscous synthetic resin. These carrier material webs 1 then pass through the heating station 16, in which the applied plastic coatings are heated to a higher temperature, during which time or subsequently the applied synthetic resin is completely absorbed by the carrier webs 1. The carrier webs 1' thusly coated with synthetic resin are then fed to the device 17, in which they are subjected briefly to a mechanical pressure while lying one upon another. The carrier material webs 1' are compressed by this pressure effect and —as already described with the aid of FIG. 1 —the synthetic resin is evenly distributed over the pore volume of the carrier material.

The superposed carrier webs 1", already fully impregnated after passing the device 17, are then cooled down in a cooling station 18 and are lastly conveyed to the cutting and stacking device 19, where they are cut into several superposed single sheets and are finally stacked.

In FIG. 3, an installation for working the process according to the invention for the concurrent impregnation of two carrier material webs is shown in diagrammatic section. It comprises a resin coating station 20 with a carrier material feeder and a resin feeder 21, and a subsequently added heating zone 22, a pair of pressure rollers 23, a cooling station 24, a cutting device 25, and a stacking device 26. The resin feeder 21 includes a resin tank 28 arranged on a frame 27, which tank has an agitator 29 and a heating device 30, and is connected by means of a pipe 31 and a dosing pump 32 to a jet 33 mounted on the machine frame of the resin coating station 20. Two delivery rolls 34, 35 for the continuous carrier material webs to be used are arranged on rotating support frames 36 and 37. In addition, a pair of calibrating rolls 38, as well as a guide roller 38 and support rollers 40 are arranged pivotally in the machine frame of the resin coating station 21. The jet 33 reaches with its aperture between the two calibrating rolls 38. A series of infrared radiators 41 are arranged in the heating zone 22 adjoining the two calibrating rolls 38.

Connected to the resin coating station 20, a heated pair of pressure rollers 23 is arranged in the material flow direction 42, in the machine frame of which two support rollers 40 are provided; one of the pressure rollers 23 is driven. The pair of pressure rollers is followed by a cooling station 24 with two pivoted and driven cooling rollers 43 as well as two support rollers 40. The subsequently following cutting device 25 is of customary design and has a further support roller 40 as well as a driven pair of conveying rollers 44. The installation terminates in a stacking device 25, which essentially consists of an elevating platform 45.

In the example of the process now to be described, a sulfate kraft paper, 175 g/m$^2$, is impregnated with a resin coating of 40% by weight (solid matter), with the so produced prepreg intended to have a volatile content of 6 to 7% by weight. For the impregnation, a phenol formaldehyde resin is used, which is produced with a molar ratio of phenol-formaldehyde equal to 1:1.5 in the usual manner, and which is thickened into a highly viscous synthetic resin in the form of an 82% aqueous solution that at 23° C. has a viscosity of approx. 100,000 mPa.s.

to carry through the process, the paper webs 46, 47 used as carrier material webs are pulled off the delivery rolls 34, 35 and are guided through the gap between the two calibrating rolls 38. The impregnating resin present in the resin tank is heated to about 50°–60° C., with its viscosity taking on values between 33,000 and 10,000 mPa.s, and is fed to the jet 33 by way of pipe 31 in a quantity controlled by the dosing pump 32.

The impregnating resin exiting from the jet aperture is then introduced as a coating between the two paper webs 46, 47. The compound 48 formed from the impregnating resin coating and the two paper webs 46 then passes through the heating zone 22, where it is heated by the infrared radiators 41° to about 110° C. At this temperature, the impregnating resin has only a viscosity of under 100 mPa.s, so that it penetrates to a great part into the pores of the two paper webs 46, 47 already while in the heating zone.

The compound 48', in which the impregnating resin coating has already been absorbed completely or at least to a largest part by the paper webs, then apsses through the pair of heated pressure rollers 23, where for a short time it is compressed so extensively that —as already explained with the aid of FIG. 1 —the synthetic resin is evenly distributed over the pore volume of the paper webs. The pair of pressure rollers 23 is maintained at a temperature of about 125° C., by which means a cooling down of the compound 48' in the pair of pressure rollers is prevented.

The compound 48'' rolling off the pair of pressure rollers 23, which then consists only of two superposed, finished impregnated paper webs, passes through the cooling station 24, in which it is recooled on the cooling rollers 43 to a temperature of about 40° C., and then through the cutting device 25, where it is cut into two superposed single sheets 49 which lastly are stacked on a pallet 50 situated on the elevating platform 45.

During the impregnation of continuous carrier material webs pursuant to the process according to the invention, the speed of passage of the carrier material webs through the impregnation installation is determined substantially by the length of time needed for the action of the applied pressure, which must be sufficient to evenly distribute the absorbed synthetic resin in the carrier material and/or to press the synthetic resin that possibly has not yet penetrated into the carrier material into the latter. Due to the generally very low resin viscosity prevailing at the time of applying pressure, the required duration of the action is generally between 0.01 and 0.5 s. When one pair of pressure rollers is used, the rate of feed results from the required duration of action and the given width of the line pressure zone between the pressure rollers, to which rate of feed the length of the heating zone has to be adjusted. For a further increase of the rate of feed, two or more pairs of pressure rollers would possibly have to be arranged, through which the carrier materials coated with synthetic resin will pass in sequence.

With the process according to the invention it is also possible to concurrently impregnate different carrier materials and/or impregnate the different carrier materials with varying synthetic resins during the concurrent impregnation of several carrier materials. It is then advantageous that the pressure is applied only when the synthetic resin has completely penetrated into the respective carrier material.

The process according to the invention is aimed at the manufacture of a stackable product, i.e., to a prepreg, for example, which usually is further processed, e.g., into laminated plastic panels, only after a shorter or longer period of storage. However, the invention also covers the case in which impregnated carrier material webs manufactured concurrently and lying upon one another are directly following thereon molded into a continuous strip of laminate and cured in a heated band press on the same production line.

COMMERCIAL APPLICATIONS

The commercial application of the process according to the invention is particularly the impregnation of papers with synthetic resins, such as are used in the manufacture of synthetic-resin-laminated plastic panels.

I claim:

1. A process for impregnating a planar compressible carrier material (1), which has an air permeability according to Gurley in the range of 1.0 to 50 s, with synthetic resin to produce a stackable planar product, wherein to begin with a liquid synthetic resin coating (5) with a synthetic resin content of 70 to 100% and/or with a viscosity at room temperature of 300 to 150,000 mPa.s is applied to one surface of the carrier material (1), whereupon without the application of a mechanical pressure the synthetic resin of the synthetic resin coating (5), which before and/or after its application is raised to a higher temperature, at least partially penetrates into the carrier material (1), and wherein after the synthetic resin of the synthetic resin coating has to its largest part penetrated into the carrier material, this carrier material (1') is thereupon subjected to such mechanical pressure that the synthetic resin possibly still present as a surface coating penetrates into the carrier material and wherein the synthetic resin evenly permeates the carrier material.

2. Process according to claim 1, wherein the pore volume of the carrier material (1') is reduced under the pressure action to such an extent that the amount of synthetic resin applied is sufficient to at least almost completely permeate the carrier material.

3. Process according to claim 1, wherein it is worked in the form of a continuous process, in which the carrier material or carrier materials, respectively, are used as continuous carrier material webs (1, 46, 47).

4. Process according to claim 1, wherein the mechanical pressure is applied only after the synthetic resin of the synthetic resin coating has completely penetrated into the carrier material.

5. Process according to one of claims 1, wherein —for the concurrent production of several impregnated carrier materials —several carrier materials (1') to which synthetic resin has been appled, in which the synthetic resin has at least partly penetrated into the carrier material, are subjected to mechanical pressure while superposed.

6. Process according to claim 1, wherein —for the concurrent production of two carrier materials impregnated with synthetic resin —a synthetic resin coating is introduced between two carrier materials (46, 47) in such a manner that it is in contact with both carrier materials (46, 47), whereupon all is brought to a higher temperature, and the synthetic resin of the synthetic resin coating penetrates at least in part into the adjoining carrier webs, and the whole is then subjected to mechanical pressure.

7. Process according to claim 5, wherein for the concurrent production of several impregnated carrier materials, different carrier materials are used.

8. Process according to claim 5, wherein for the concurrent production of several impregnated carrier materials, the different carrier materials are impregnated with varying synthetic resins.

9. Process according to claim 3, wherein the mechanical pressure is applied as line pressure by means of pressure rollers (9, 23).

10. Process according to claim 9, wherein such line pressure is applied repeatedly in succession.

11. Device for impregnating a planar compressible carrier material characterized by a device (10) for feeding one or more carrier material webs (1), by one or more devices (15) for applying liquid synthetic resin in the form of coatings to or on these carrier material webs (1), respectively, by a heating device (16) for heating synthetic resin coatings, by a device (17) for applying pressure to the carrier material webs (1') coated with synthetic resin, by possibly a cooling station (24) for the impregnated carrier material webs (1''), and by one or more take-up devices or by a cutting device with stacking device (19) for the impregnated carrier material (1'').

12. Device according to claim 11, wherein the device (17) for applying pressure consists of one or several sequentially arranged, possible heated pairs of pressure rollers (9, 23).

13. Device for the concurrent impregnation of two continuous carrier material webs according to claim 11, wherein the device for applying a liquid synthetic resin coating has a pair of calibrating rollers and a jet (33) whose aperture reaches between the calibrating rolls (33) to introduce the liquid synthetic resin coating between the two carrier material webs (46, 47).

* * * * *

UNITED STATES PATENT AND TRADEMARK OFFICE
CERTIFICATE OF CORRECTION

PATENT NO. : 4,687,685

DATED : Aug 18, 1987

INVENTOR(S) : GERHARD MELCHER

It is certified that error appears in the above-identified patent and that said Letters Patent is hereby corrected as shown below:

Col. 6,

Claim 1 should read as follows:

1. A process for impregnating a planar compressible carrier material (1), which has an air permeability according to Gurley of more than 1.0 s, with synthetic resin to produce a stackable planar product, wherein to begin with a liquid synthetic resin coating (5) with a synthetic resin content of 70 to 100% is applied to one surface of the carrier material (1), whereupon without the application of a mechanical pressure the synthetic resin of the synthetic resin coating (5), which before and/or after its application is raised to a higher temperature, at least partially penetrates into the carrier material (1), and wherein after the synthetic resin of the synthetic resin coating has to its largest part penetrated into the carrier material, this carrier material (1') is thereupon subjected to such mechanical pressure that the synthetic resin possibly still present as a surface coating penetrates into the carrier material and wherein the synthetic resin evenly permeates the carrier material.

Signed and Sealed this

Twenty-ninth Day of December, 1987

*Attest:*

DONALD J. QUIGG

*Attesting Officer*  Commissioner of Patents and Trademarks